US006877116B1

(12) United States Patent
Kost et al.

(10) Patent No.: US 6,877,116 B1
(45) Date of Patent: Apr. 5, 2005

(54) METHOD AND APPARATUS FOR DETERMINING BIT ERROR RATE IN A SAMPLED DATA SYSTEM WITHOUT REQUIRING READ CHANNEL CIRCUITRY

(75) Inventors: Robert E. Kost, Minneapolis, MN (US); Jian-Gang Zhu, Monroeville, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/141,493

(22) Filed: Aug. 27, 1998

Related U.S. Application Data

(60) Provisional application No. 60/058,009, filed on Aug. 28, 1997.

(51) Int. Cl.$^7$ .......................... G06F 11/00; G01R 31/28
(52) U.S. Cl. ....................................... 714/704; 714/738
(58) Field of Search ..................................... 714/1–824

(56) References Cited

U.S. PATENT DOCUMENTS

| | | | |
|---|---|---|---|
| 4,394,695 A | * | 7/1983 | Mahon ........................ 360/53 |
| 5,121,263 A | | 6/1992 | Kerwin et al. ................ 360/53 |
| 5,600,500 A | | 2/1997 | Madsen et al. ............... 360/46 |
| 5,727,074 A | * | 3/1998 | Hildebrand .................. 381/103 |
| 5,754,353 A | * | 5/1998 | Behrens et al. .............. 360/53 |
| 5,771,127 A | * | 6/1998 | Reed et al. ................... 360/51 |
| 5,774,470 A | | 6/1998 | Nishiya et al. ................ 371/3 |
| 5,786,954 A | | 7/1998 | Yada et al. .................... 360/51 |
| 5,799,010 A | * | 8/1998 | Lomp et al. ................. 370/335 |
| 5,987,634 A | * | 11/1999 | Behrens et al. ............. 714/719 |
| 6,005,731 A | * | 12/1999 | Foland, Jr. et al. ........... 360/53 |

OTHER PUBLICATIONS

Daniel D. Woods, "Comparison and Optimization of Digital Read Channels using Actual Data", IEEE, 1993.*
Yuanjie Chen and Chrysostomos L. Nikias, "Blind Identifiability of a Band–Limited Nonminimum Pase Sstem from its Output Autocorrelations", IEEE, 1993.*

* cited by examiner

Primary Examiner—Phung M. Chung
Assistant Examiner—Joseph D. Torres
(74) Attorney, Agent, or Firm—Joseph R. Kelly; Westman, Champlin & Kelly, P.A.

(57) ABSTRACT

A system determines bit error rate in a sampled data system having a disc formed of a magnetic medium and a data head for writing data on the disc and retrieving data from the disc. A pattern is written on the disc, which includes isolated instances associated with a predetermined event. The pattern is retrieved from the disc and the isolated instances are combined to obtain a representative instance having a reduced media noise component. The representative instance is combined with each, of the isolated instances to obtain noise sequences. An autocorrelation component is obtained based on the instances read from the disc and the noise sequences. A channel filter is developed having an impulse response based on the representative instance and based on the channel requirements for a predetermined channel model. A representative instance is passed through the filter to obtain a filter output sample, and an error value indicative of the bit error rate is determined based on the filter output sample and the autocorrelation component.

18 Claims, 9 Drawing Sheets

FIG. 4
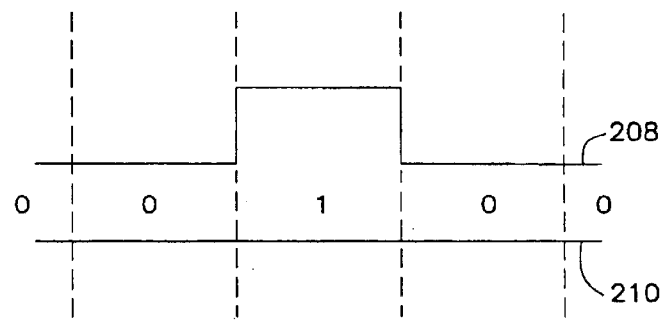
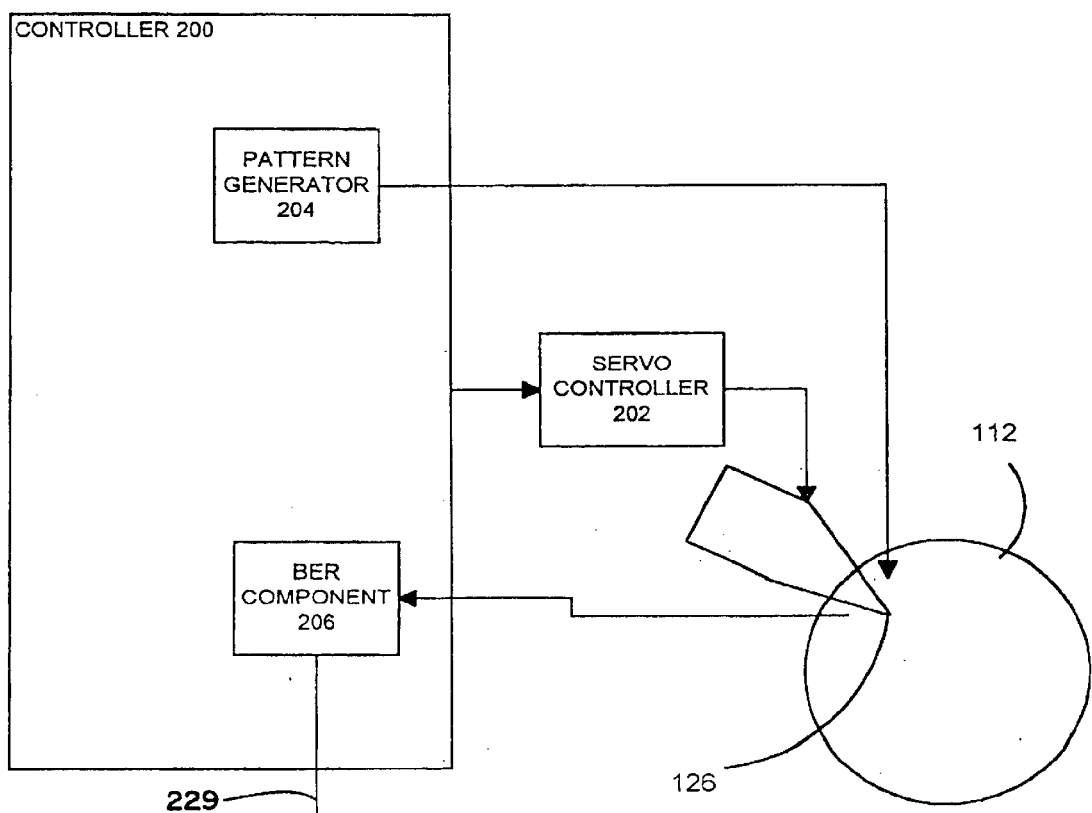
FIG. 3

METHOD AND APPARATUS FOR DETERMINING BIT ERROR RATE IN A SAMPLED DATA SYSTEM WITHOUT REQUIRING READ CHANNEL CIRCUITRY

REFERENCE TO RELATED APPLICATION

The present application claims priority from U.S. provisional application Ser. No. 60/058,009 filed on Aug. 28, 1997.

FIELD OF THE INVENTION

The present invention relates to sampled data systems. More particularly, the present invention relates to a system for determining the bit error rate of a sampled data system including a disc and a data head used to write data to the disc and retrieve data from the disc.

BACKGROUND OF THE INVENTION

A typical disc drive includes one or more magnetic discs mounted for rotation on a hub or spindle. A typical disc drive also includes a transducer supported by a hydrodynamic air bearing which flies above each magnetic disc. The transducer and the hydrodynamic air bearing are collectively referred to as a data head. A drive controller is conventionally used for controlling the disc drive based on commands received from a host system. The drive controller controls the disc drive to retrieve information from the magnetic discs and to store information on the magnetic discs.

An electromechanical actuator operates within a negative feedback, closed-loop servo system. The actuator moves the data head radially over the disc surface for track seek operations and holds the transducer directly over a track on the disc surface for track following operations.

Information is typically stored in concentric tracks on the surface of magnetic discs by providing a write signal to the data head to encode flux reversals on the surface of the magnetic disc representing the data to be stored. In retrieving data from the disc, the drive controller controls the electromechanical actuator so that the data head flies above the magnetic disc, sensing the flux reversals on the magnetic disc, and generating a read signal based on those flux reversals. The read signal is typically conditioned and then decoded by the drive controller to recover data represented by flux reversals stored on the magnetic disc, and consequently represented in the read signal provided by the data head.

A typical read back system includes the data head, preconditioning logic (such as preamplification circuitry and filtering circuitry), a data detector and recovery circuit, and error detection and correction circuitry. The read back system can be implemented either as discrete circuitry, or in a drive controller associated with the disc drive.

In disc drives, it is important that the error rate per number of bits recorded (the bit error rate) be maintained at a relatively low level. In a functioning disc drive, bit error rate can be estimated in a number of ways. For example, various data patterns can be continuously written to and read from the discs in the disc drive, and the number of errors encountered in reading the data can simply be counted. During the development of next generation disc drives, however, it is not uncommon for a drive manufacturer to test and evaluate a number of different data heads, or different types of data heads, before choosing a data head for implementation in the next generation disc drive. The development of data heads often precedes the development of read channel circuitry which will eventually be used with those data heads. Therefore, it becomes difficult to estimate the bit error rate of a system employing such data heads, without the read channel circuitry being available.

In the past, others have attempted, without success, to estimate the bit error rate of a system employing such a head (where the read channel circuitry is unavailable) by taking measurements which were thought to be at least of some help in the estimate. Typically, such measurements would include the measurement of the signal recorded on the disc, and noise, to the extent this could be measured. However, such prior measurements have not correlated well to the bit error rate encountered in employing such data heads in a disc drive system.

The present invention is directed to a system that addresses these and other problems, and offers other advantages over the prior art.

SUMMARY OF THE INVENTION

A system determines bit error rate in a sampled data system having a disc formed of a magnetic medium and a data head for writing data on the disc and retrieving data from the disc. A pattern is written on the disc which includes M isolated instances associated with a predetermined event. The pattern is retrieved from the disc and the M isolated instances are combined to obtain a representative instance having a reduced electronic noise component. The representative instance is combined with each of the isolated instances to obtain M noise sequences. An autocorrelation component is obtained based on the M instances read from the disc and the M noise sequences. A channel filter is developed having an impulse response based on the representative instance and based on the channel requirements for a predetermined channel model. A representative instance is passed through the filter to obtain a filter output sample, and an error value indicative of the bit error rate is determined based on the filter output sample and the autocorrelation component.

The present invention can be implemented as both a method and an apparatus.

BRIEF DESCRIPTION OF THE DRAWINGS

FIG. 3 is a block diagram illustrating a system for determining the bit error rate associated with a data head without use of the read/write channel electronics.

FIG. 4 illustrates a dominant error event.

FIG. 7-1 illustrates a pattern of isolated pulses in accordance with one embodiment of the present invention.

FIG. 7-2 illustrates manipulation of the isolated instances shown in FIG. 7-1 in order to obtain a noiseless sample.

DETAILED DESCRIPTION OF THE PREFERRED EMBODIMENTS

The present invention provides a system by which the bit error rate associated with a data sampling system employing a data head can be determined without the need of having read/write channel circuitry normally associated with a disc drive employing the data head. However, for purposes of a full understanding of the present invention, a disc drive, and its associated read/write channel circuitry are described herein for the purposes of clarity.

Figure 1:
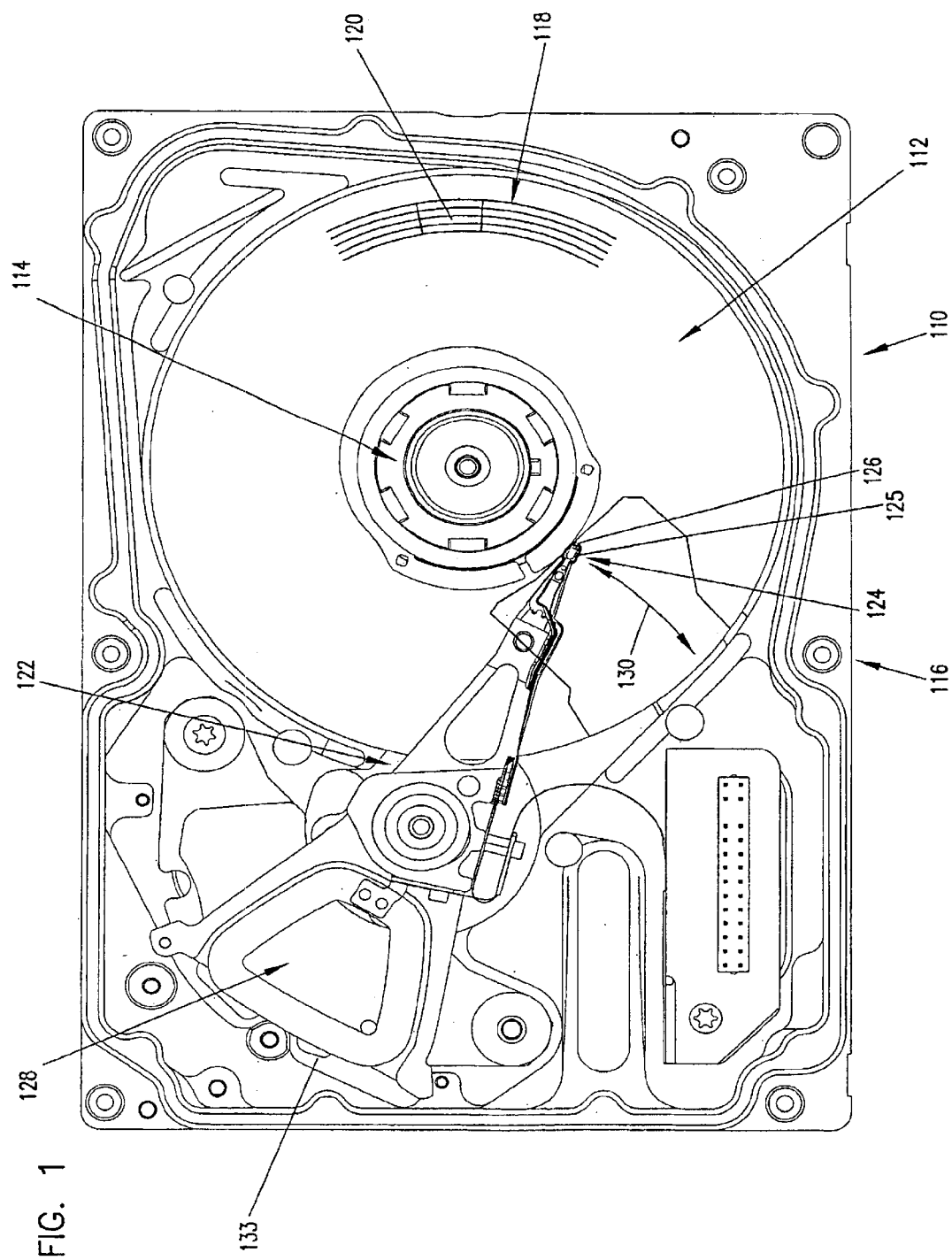
FIG. 1 is a top view of a disc drive with its upper casing removed.

Referring to FIG. 1, a rotary magnetic disc drive system is shown in diagrammatic form and is referred to generally at 110. A plurality of magnetic information storage discs 112 are journaled about a spindle motor assembly 114 within a housing 116. Each magnetic disc 112 has a multiplicity of concentric circular recording tracks, indicated schematically at 118 for recording information. Each track 118 is subdivided into a plurality of sectors, indicated schematically at 120. Data can be stored on or retrieved from the discs 112 by referencing a specific track 118 and sector 120. An actuator arm assembly 122 is rotatably mounted preferably in one corner of the housing 116. The actuator arm assembly 122 carries a plurality of head gimbal assemblies 124 that each carry a slider 125 having a read/write head, or transducer 126, for reading information from and writing information onto the magnetic discs 112. A voice coil motor 128 is adapted to precisely rotate the actuator arm assembly 122 back and forth such that the transducers 126 move across the magnetic discs 112 along arc 130.

Figure 2:
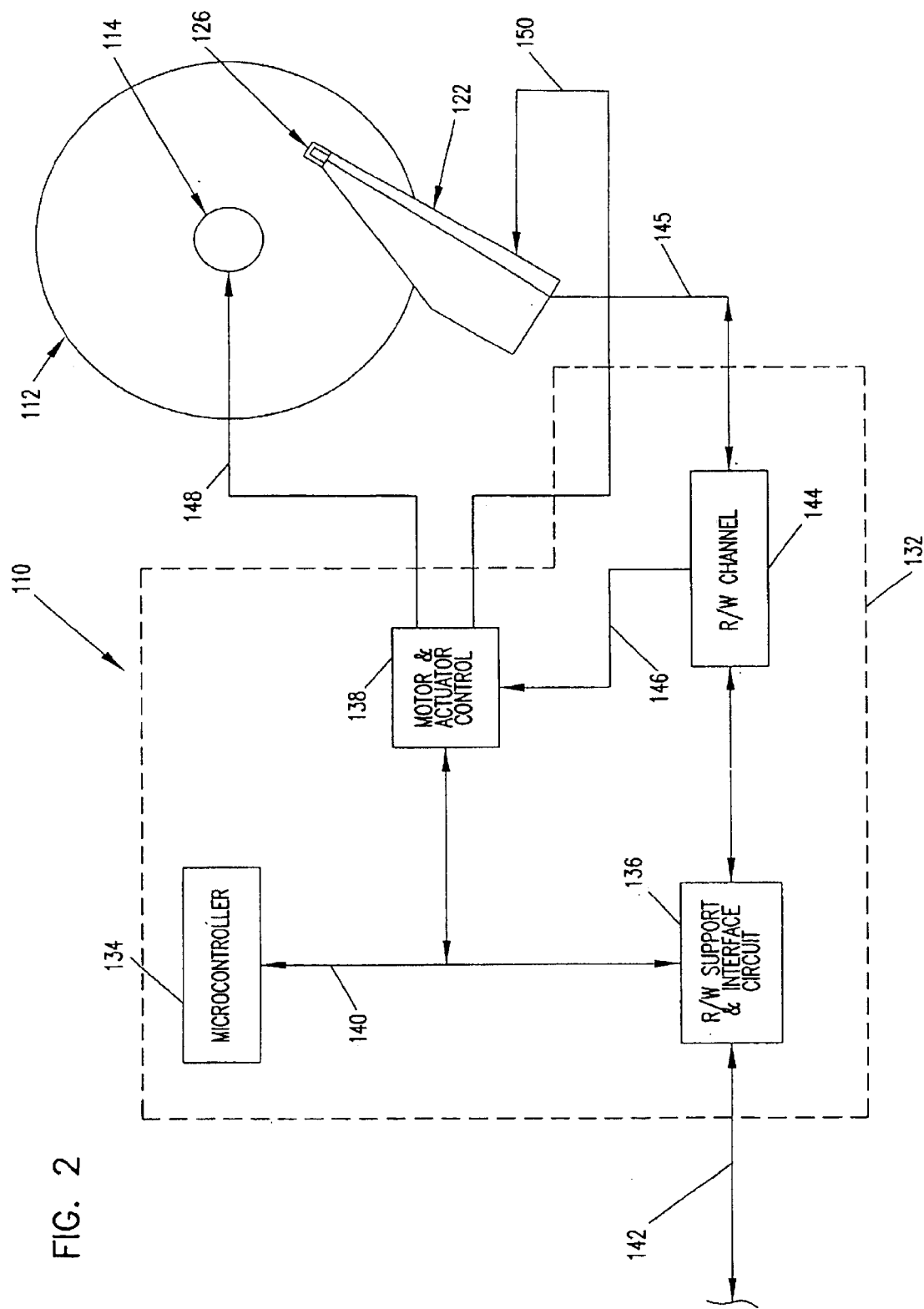
FIG. 2 is a high level block diagram of the disc drive shown in FIG. 1.

FIG. 2 shows a high level block diagram of the control circuitry 132 of disc drive system 110. The disc drive system 110 includes control circuitry 132 for controlling the position of the transducers 126 and for processing information to be written to or received from the discs 112. A microcontroller 134 directly implements all of the primary functions of the disc drive system 110. A read/write support and interface control circuit, indicated generally at 136, and a motor and actuator controller 138 are connected to the microcontroller 134 by a general purpose data, address, and control bus 140. Circuit 136 in general provides a hardware interface between the disc drive system 110 and a host computer system (not shown) via a communications bus 142. Also, circuit 136 in general provides an interface between the motor and actuator controller 138 and a read/write channel 144. The read/write channel 144 acts as an interface between the microcontroller 134 and the transducers 126 over lines 145. The read/write channel 144 also provides signals over line 146 to the motor and actuator controller 138. Controller 138 is provided as an interface between the microcontroller 134 and the motor assembly 114 over lines 148, and an interface between the microcontroller 134 and the actuator arm assembly 122 over lines 150.

Data to be written to disc 112 is provided to read/write support interface circuit 136 which, in turn, provides the data to read/write channel 144. Read/write channel 144 passes the data to data head 126 which acts to encode the data on the surface of disc 112.

In order to read data from disc 112, head 126 passes over a track on the surface of the disc 112 on which data is written and generates a read signal indicative of the flux reversals on the track. The read signal is provided from data head 126 to read/write channel 144 which may typically include a channel filter and a detector. One common type of channel filter is a finite impulse response (FIR) filter with multiple taps. A common type of detector is a Viterbi-type detector which detects data according to a trellis structure, in a known manner. The filter passes the data to the Viterbi detector where the data is detected. The detected data is provided, typically to a decoder where the data is decoded and passed on for further processing.

When a manufacturer is evaluating a new or different data head 126, the drive manufacturer may not have access to read/write channel circuitry 144 which will be used along with the new data head. The read/write channel circuitry 144 may typically not be completely developed at the time that the data head is being tested and evaluated.

FIG. 3 is a block diagram of a bit error rate measuring system in which the bit error rate of a sampled data system, including head 126 and disc 112. The system shown in FIG. 3 includes controller 200, servo controller 202, data head 126 and disc 112. Controller 200 includes pattern generator 204 and bit error rate (BER) component 206. A bit error rate is calculated directly from measurements made using head 126 and media (or disc) 112, and the read/write channel electronics are not required.

The measurements in accordance with the present invention allow calculation of the probability of error for some specific error event.

Pattern generator 204 generates a pattern associated with a dominant error event (or any other desired error event for which the bit error rate is desired). Pattern generator 204 is coupled to head 126 and controls head 126 to write the pattern on the surface of disc 112. Servo controller 202 can be any suitable servo controller, such as motor and actuator control circuit 138 shown in FIG. 2. Servo controller controls the radial position of head 126 relative to disc 112.

BER component 206 retrieves the pattern written on disc 112 directly from head 126, without associated read/write channel circuitry. The raw read signal from head 126 (after undergoing conventional amplification and conditioning) is used by BER component 206 to measure the bit error rate associated with the system.

FIG. 4 illustrates a first wave shape 208 and a second wave shape 210. It has been observed that one dominant error event in such systems results from writing a dipulse illustrated by waveform 208 in FIG. 4 to the surface of disc 112 and reading a constant magnetization indicated by wave shape 210. In other words, the dominant error event results from expecting samples +/− (10-1) and reading samples (000). Thus, while the bit error rate can be measured for any desired error event, the present description proceeds with respect to the error event in which a dipulse is written and a constant magnetization is read.

For the purposes of clarity, the expression for the probability of error encountered using a trellis detector is now derived. Consider the probability of some specific error event when a decision is being made by a trellis, as is the case for a Viterbi-type detector. Such an error event occurs when the path metric of the incorrect path is smaller than the path metric of the correct path through the trellis. Assume the correct path is path "a" having a path metric $M_a$ at the merging state. Assume further that the incorrect path is path "b" with a path metric $M_b$ at the merging state. Then:

$$Prob(Error) = Prob[M_b < M_a] \qquad \text{(Eq. 1)}$$

$$= Prob[(s_k - b_k)^2 < (s_k - a_k)^2]$$

where $S_k$ represents noisy samples and $a_k$ and $b_k$ represent the noiseless values of path a and path b, respectively.

Eq. 1 can be rewritten as follows:

$$Prob(\text{Error}) = Prob[-2\Sigma n_k e_k > \Sigma e_k^2] \quad \text{(Eq. 2)}$$

where $e_k = a_{k-b_k}$, and $n_k$ represents the noise sample at time k. Note that the sequence $[e_k]$ is the error event causing the error. In the case of a PR4 channel, $[e_k]=[10\text{-}1]$ or $[-101]$. For an EPR4 channel, $[e_k]=[11\text{-}1\text{-}1]$ or $[-1\text{-}111]$.

Of course, other error events can also be considered. We will assume that the sum over $n_k e_k$ will be very nearly Gaussian. Therefore, the standard Q (or error) function can be used. Thus, Eq. 2 becomes:

$$Prob(Error) = BER = Q\left[\frac{\Sigma e_k^2}{2\sqrt{Var\Sigma n_k e_k}}\right] \quad \text{(Eq. 3)}$$

Eq. 3 defines the effective signal to noise ratio (ESNR) by the following expression:

$$i\ Prob(\text{Error}) = BER = Q[ESNR] \quad \text{(Eq. 4)}$$

Specifically, for a PR4 channel:

$$BER = Q\left[\frac{smp}{\sqrt{R(t_1, t_1) + R(t_3, t_3) - 2R(t_1, t_3)}}\right] \quad \text{(Eq. 5)}$$

For an EPR4 channel:

$$BER = Q\left(\frac{2smp}{DEN}\right) \quad \text{(Eq. 6)}$$

where
$DEN = R(t_1, t_1) + R(t_2, t_2) + R(t_3, t_3) + R(t_4, t_4) + 2R(t_1, t_2) - 2R(t_1, t_3) - 2R(t_1, t_4) - 2R(t_2, t_3) - 2R(t_2, t_4) + 2R(t_3, t_4)$ Having obtained an expression for bit error rate generally, and specifically for a PR4 channel and an EPR4 channel, the system in which measurements are taken to obtain the bit error rate value can now be described in greater detail.

Figure 5:
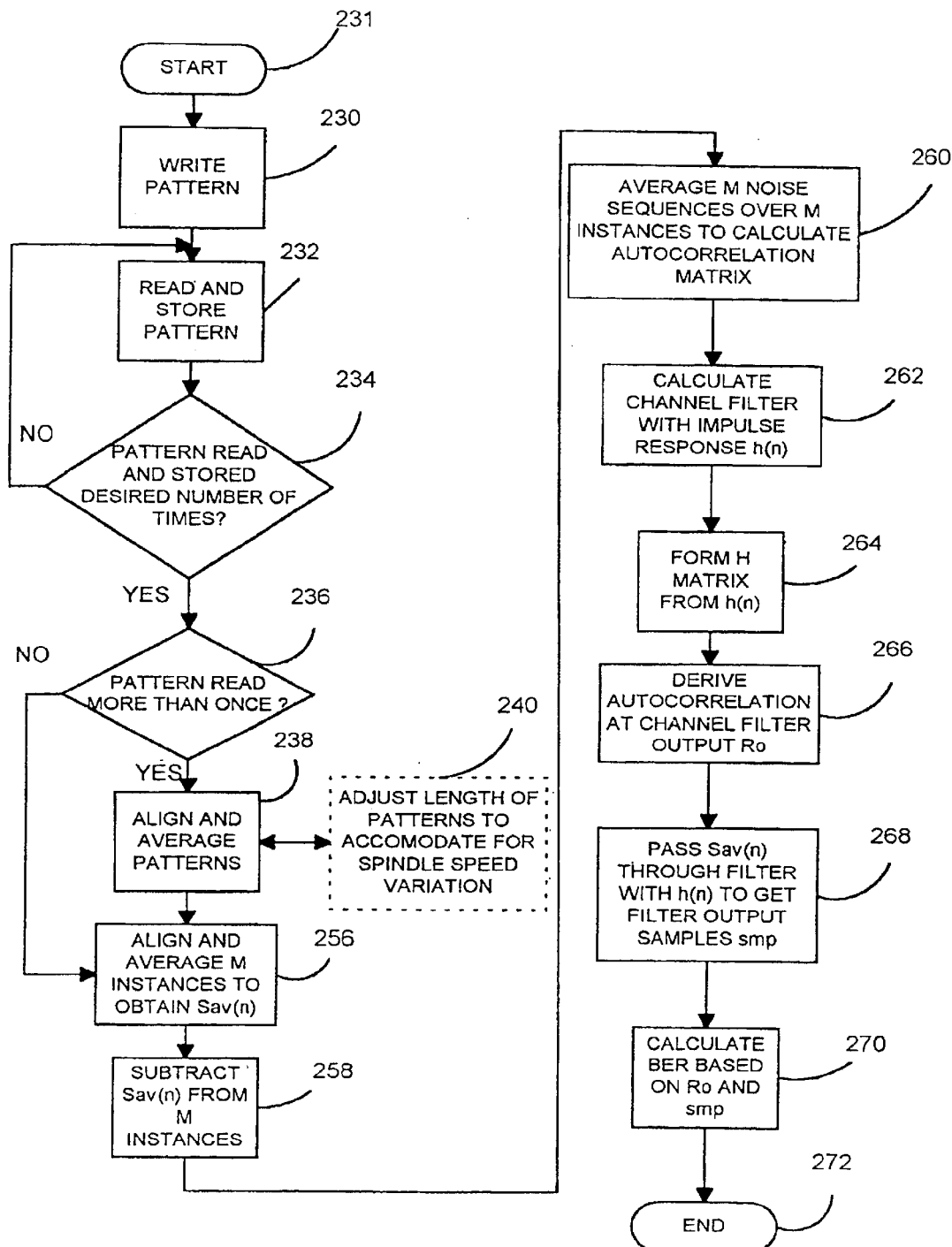
FIG. 5 is a flow diagram illustrating the operation of the system shown in FIG. 3.
Figure 6:
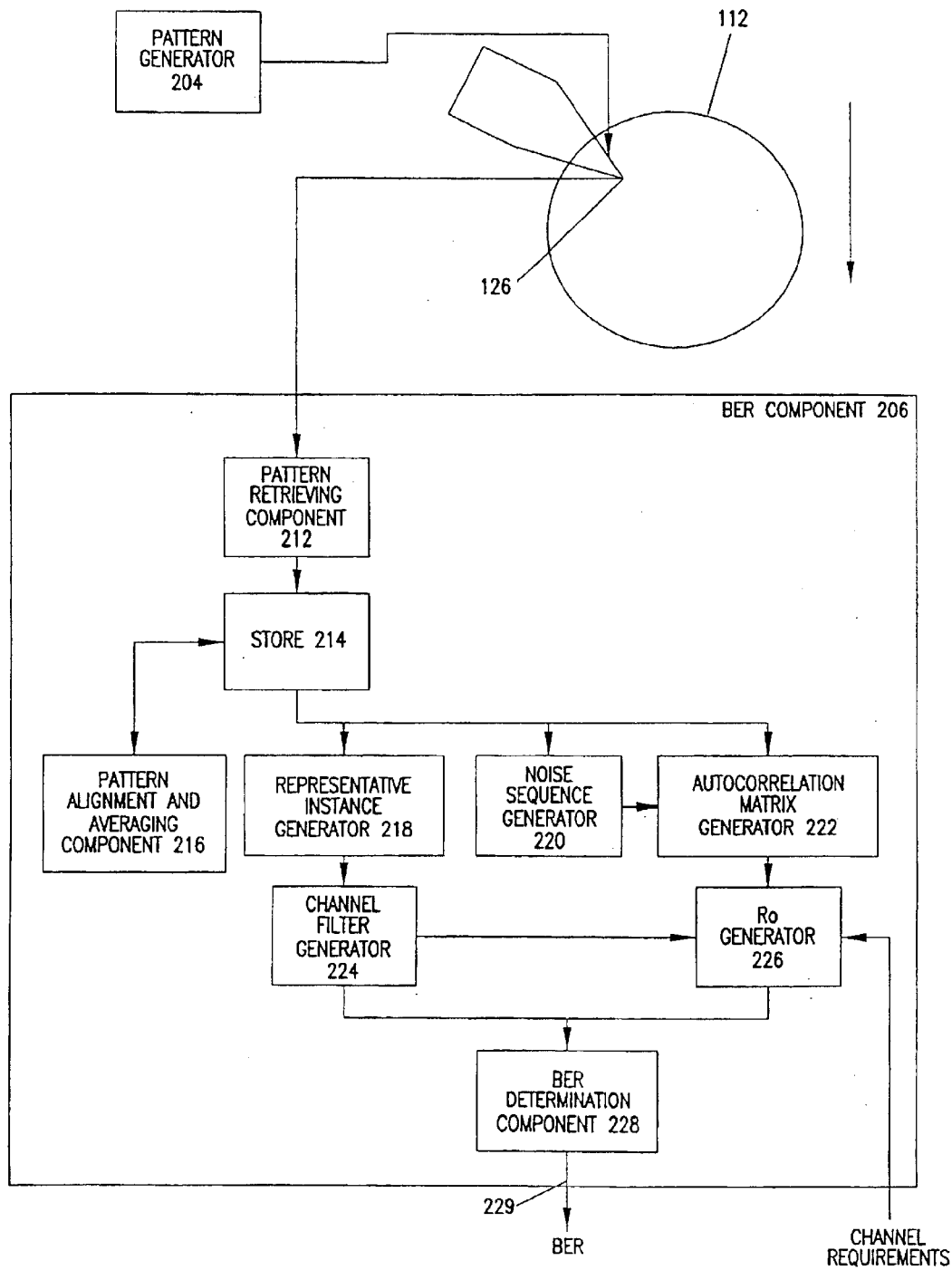
FIG. 6 is a block diagram illustrating the system shown in FIG. 3 in more detail.

FIG. 5 is a flow diagram (from blocks 230–272) illustrating the operation of BER component 206 shown in FIG. 3. In addition, FIG. 6 is a more detailed functional block diagram of BER component 206.

BER component 206 includes pattern retrieving component 212, data store 214, pattern alignment and averaging component 216, representative instance generator 218, noise sequence generator 220, autocorrelation matrix generator 222, channel filter generator 224, $R_o$ generator 226, and BER determination component 228. It should be noted that substantially all of the functional blocks illustrated in FIG. 6 can be performed in a single integrated microprocessor or microcontroller with associated program modules, memory and timing circuitry. The operation of BER component 206 is described with respect to both FIGS. 5 and 6.

Figures 1, 7:
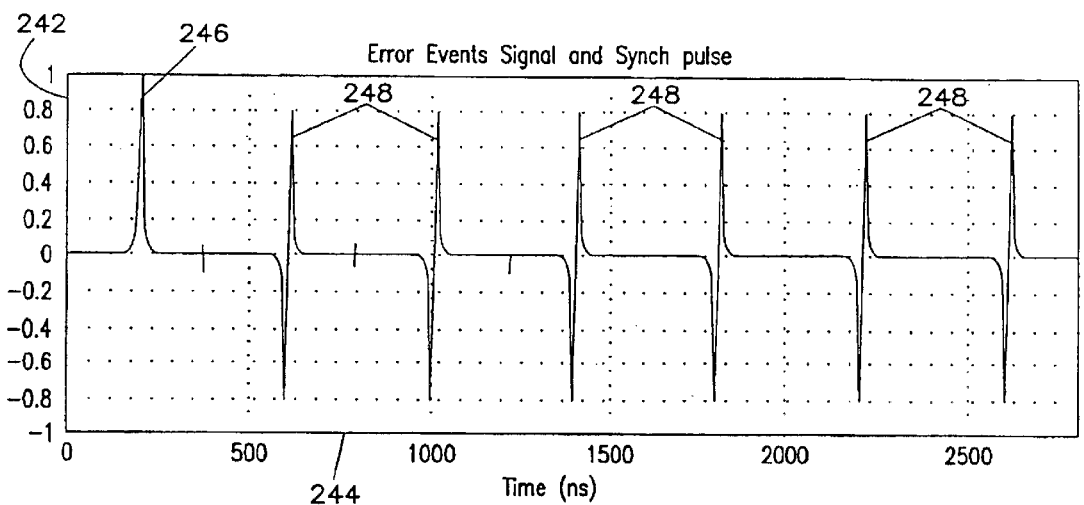
Figures 2, 7:
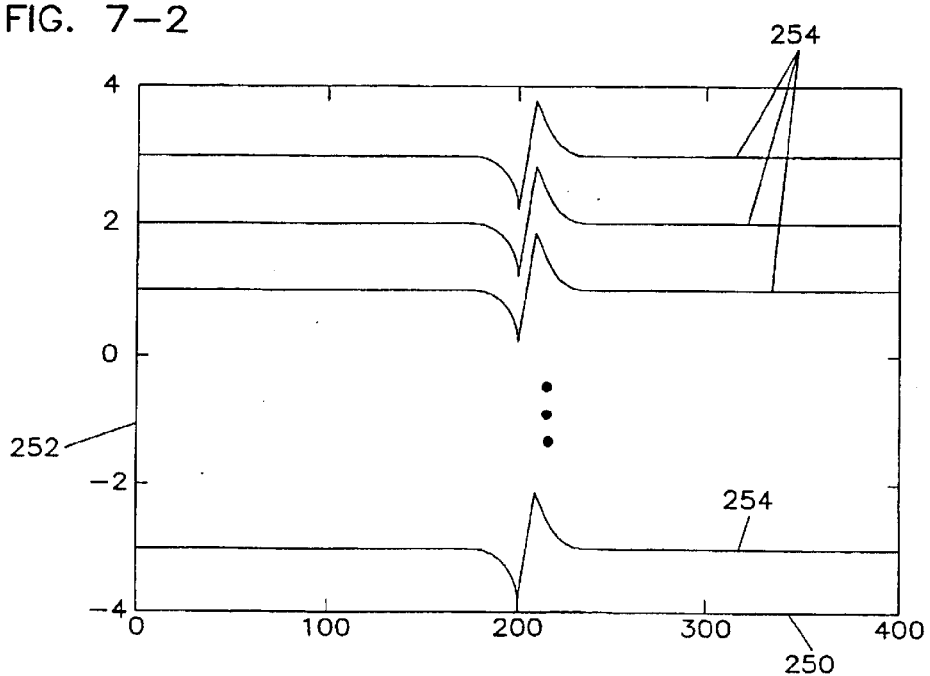

First, an appropriate pattern is written once beginning with an isolated pulse which is used for signal alignment. For purposes of the present discussion, in which the error event is that of writing a dipulse and reading a constant magnetization, the appropriate pattern is an isolated dipulse. The written pattern preferably contains a plurality (for example M) isolated instances that reflect the error event. One illustrative example of a pattern written on the surface of disc 112 is illustrated in FIG. 7-1. FIG. 7-1 plots voltage along axis 242 and time along axis 244. Alignment pulse 246 is provided in a first frame of the pattern. Thereafter, a plurality of isolated dipulses 248 are recorded.

Of course, if the error event in question were a shifted tripulse, M isolated tripulses would be written to disc 112.

In one illustrative embodiment, the pattern contains 220 isolated instances which reflect the error event. Writing of the pattern onto disc 112 is illustrated by block 230 in FIG. 5.

Next, pattern retrieving component 212 retrieves the pattern from disc 112. Pattern retrieving component 212, in one illustrative embodiment, includes conventional amplification and signal conditioning circuitry for receiving the read signal from data head 126. Pattern retrieving component 212 then provides a signal indicative of the read signal from disc drive 112 to data storage component 214, which illustratively comprises one or more solid state memory devices. Reading and storing the pattern is illustrated by block 232 in FIG. 5.

In one illustrative embodiment, the bit error rate which is substantially independent of electronic noise can be obtained. In order to do this, pattern retrieving circuit 212 reads the pattern a plurality of times (such as twenty times) and stores each of the read patterns in data store 214. This is indicated by block 234 in FIG. 5. The reason for reading the pattern a plurality of times is that the plurality of patterns read from disc 112 can then be averaged in order to suppress the electronic noise associated with the read signal. The average pattern will thus have a significantly reduced electronic noise component associated therewith. Of course, the more times the pattern is read and averaged, the less will be the associated electronic noise component. If the electronic noise is to be included in the calculation of the bit error rate, then the pattern is only read once from the surface of disc 112.

In any case, if the pattern is read more than once, then each of those patterns are retrieved from data store 214 by pattern alignment and averaging component 216. Pattern alignment and averaging component 216 uses the alignment signal 246 (an isolated pulse in one illustrative embodiment) to properly align all of the patterns. Component 216 then averages all of the patterns to obtain an averaged pattern. If the pattern is read N times and the N patterns are averaged, the electronic noise component associated with the pattern will be reduced by a factor of $1/\sqrt{N}$. Further, the velocity with which the spindle supporting disc 112 rotates may be susceptible of variation. Thus, component 216 can optionally adjust the length of the patterns to accommodate for spindle speed variations, prior to averaging. Alignment and averaging of the patterns, and adjustment of the length of the patterns is indicated by blocks 236, 238 and 240 in FIG. 5.

Recall that the pattern written on the disc contains M isolated instances. Once an average pattern is obtained, the M isolated instances in the averaged pattern are separated and temporally aligned such that they can be averaged in order to suppress any media noise component associated with the M isolated instances. FIG. 7-2 is a graph which has time plotted along axis 250 and voltage plotted along axis 252. FIG. 7-2 illustrates a plurality of isolated instances 254 which have been aligned for averaging. In order to average the isolated instances 254, representative instance generator 218 retrieves the averaged pattern from data store 214, separates the pattern into M isolated pulses, aligns the pulses, and averages them. This is indicated by block 256 in FIG. 5. The averaged signal is designated $s_{av}(n)$ which has a suppressed media noise component. Thus, the signal $s_{av}(n)$ has been derived in such a way that electronic noise and media noise are both removed therefrom.

The signal $s_{av}(n)$ is then subtracted from the M isolated (and noisy) instances in order to obtain a M noise sequences.

Noise sequence generator 220 retrieves both the M isolated noisy sequences, and the noiseless sequences (contained in $S_{av}(n)$) from data store 214, and subtracts one from the other. This generates the M noise sequences which are provided to autocorrelation matrix generator 222. This is indicated by block 258 in FIG. 5.

Autocorrelation matrix generator 222 averages the M noise sequences over the M isolated noisy instances in order to obtain an autocorrelation matrix, R. The expression for the autocorrelation matrix is as follows:

$$R(i,j) = \frac{1}{M}\sum_k n_k(i)n_k(j) \quad \text{(Eq. 7)}$$

where k is summed from 0 to M−1 over the M noise sequences. The indices i and j refer to points in a specific noise sequence. The length of the noise sequence is L. Generation of the autocorrelation matrix is indicated by block 260 in FIG. 5.

Next, channel filter generator 224 generates a channel filter. In doing this, channel filter generator 224 uses the signal $s_{av}(n)$ as the channel filter input and imposes channel requirements on the channel filter output. The channel requirements correspond to the requirements of the desired channel model (i.e., the channel equalization target) chosen. For instance, the channel requirements correspond, in one illustrative embodiment, to one of the PR4 channel, the EPR4 channel, and the $E^2$PR4 channel. Based upon the channel filter input and the channel requirements at the channel filter output, channel filter generator 224 generates a channel filter with an impulse response h(n). The length of the impulse response h(n) is also L. This is indicated by block 262 in FIG. 5.

Next, $R_o$ generator 226 generates the autocorrelation matrix at the channel filter output ($R_o$) In order to do this, $R_o$ generator 226 first generates a matrix H, which is a 2L−1 by L matrix (note that R is an L by L matrix). The H matrix is generated from h(n) in the following manner:

$H(j,k)=h(j-k)$ when $0 \leq (j-k) \leq (i-1)$ $H(j,k)=0$ otherwise, where $0 \leq j \leq (2L-2)$ and $0 \leq k \leq (L-1)$ (Eq. 8)

and where L is the length of the noise sequences.

The autocorrelation of the noise at the output of the channel filter, which is at the Viterbi trellis input, can be computed from R and H described above. The autocorrelation matrix of the channel filter output is defined as follows:

$$R_o(i,j)=E[n'(i)n'(j)] \quad \text{(Eq. 9)}$$

where E is an expectation operator and n'(i) is the filtered noise sequence.

The filtered noise at the channel filter output is given by:

$$n'(i) = \sum_k n(k)h(i-k) \quad \text{(Eq. 10)}$$

where n(k) is the channel filter input noise sequence and h(n) is the unit sample response of the channel filter.

The length of n(k) and h(n) is 1. By substituting Eq. 10 into Eq. 9 above, the following follows:

$$R_o(i,j) = E\left[\sum_k n(k)h(i-k) \sum_l n(l)h(j-l)\right] \quad \text{(Eq. 11)}$$

$$= \sum_k h(i-k) \sum_l h(j-l) E[n(k)n(l)]$$

$$= \sum_k h(i-k) \sum_l h(j-l) R(k,l)$$

where $0 \leq i \leq 2L-2$, $0 \leq j \leq 2L-2$, $0 \leq k \leq L-1$, and $0 \leq l \leq L-1$ Eq. 11 can written in matrix notation as follows:

$$R_o = HRH^T \quad \text{(Eq. 12)}$$

where $H(i,j)=h(j-i)$ for $0 \leq (j-i) \leq L-1$ $H(i,j)=0$ otherwise.

Forming the H matrix and deriving the autocorrelation matrix at the channel filter output $R_o$ is indicated by blocks 264 and 266 in FIG. 5.

The signal $s_{av}(n)$ is then passed through the filter having the impulse response h(n). This provides noise free samples +/− (smp, 0, −smp) at the channel filter output, where smp represents a sample value. Thus, there is now enough information to compute the bit error rate as defined by Eqs. 5 and 6. Specifically, for the PR4 channel, the bit error rate can be calculated as follows:

$$BER = Q\left[\frac{smp}{\sqrt{R_o(t_1,t_1) + R_o(t_3,t_3) - 2R_o(t_1,t_3)}}\right] \quad \text{(Eq. 13)}$$

where Q is the standard Gaussian q-function. The bit error rate determination component thus retrieves the appropriate values of the autocorrelation component at the channel filter output $R_o$ from $R_o$ generator 226, and retrieves the noiseless samples from channel filter 224, and calculates the bit error rate 229. This is indicated by blocks 268, 270 and 272 in FIG. 5. It should be noted that this can be done without the read/write channel circuitry and without significant approximations.

Figure 8:
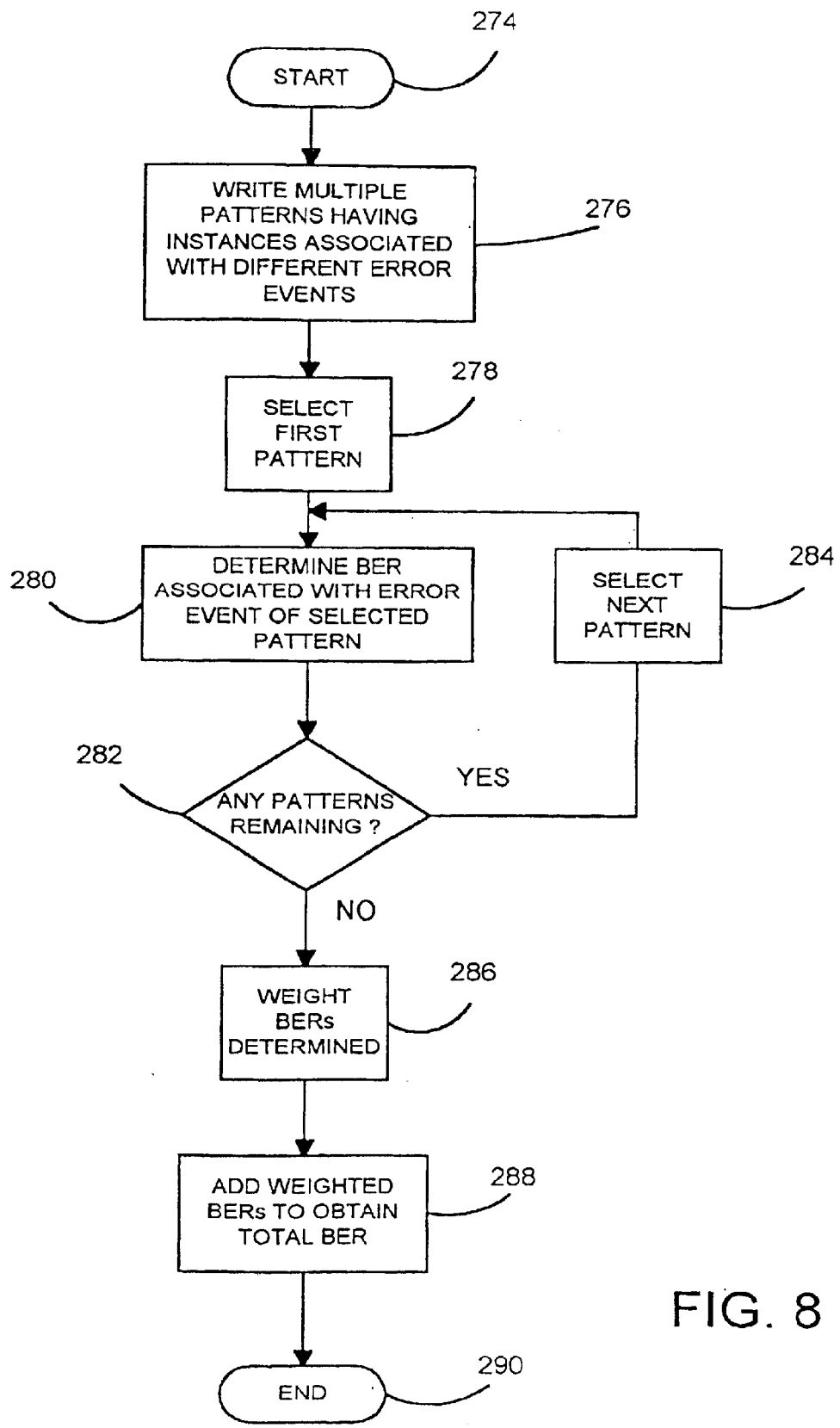
FIG. 8 is a flow diagram illustrating the operation of the system shown in FIG. 6 in accordance with another aspect of the present invention.

A total BER including a BER corresponding to more than one error event is also contemplated by the present invention. FIG. 8 is a flow diagram illustrating the calculation of such a total bit error rate. First, multiple patterns are written to disc 112, each pattern having isolated instances associated with different error events. This is indicated by blocks 274 and 276. A first of the multiple patterns is selected, and the bit error rate associated with the error event represented by that pattern is determined. This is indicated by blocks 278 and 280. The determination of the bit error rate is done in substantially the same way as that described with respect to FIG. 5. If any patterns remain, they are, selected and the bit error rate associated with those patterns is also determined. This is indicated by blocks 282 and 284.

After all of the bit error rates have been calculated, they are weighted according to their dominance on the overall bit error rate. The weighting functions are preferably determined empirically. This is indicated by block 286. All of the weighted bit error rates are then added together in order to obtain the total bit error rate for the various error events considered. This is indicated by blocks 288 and 290.

Figure 9:
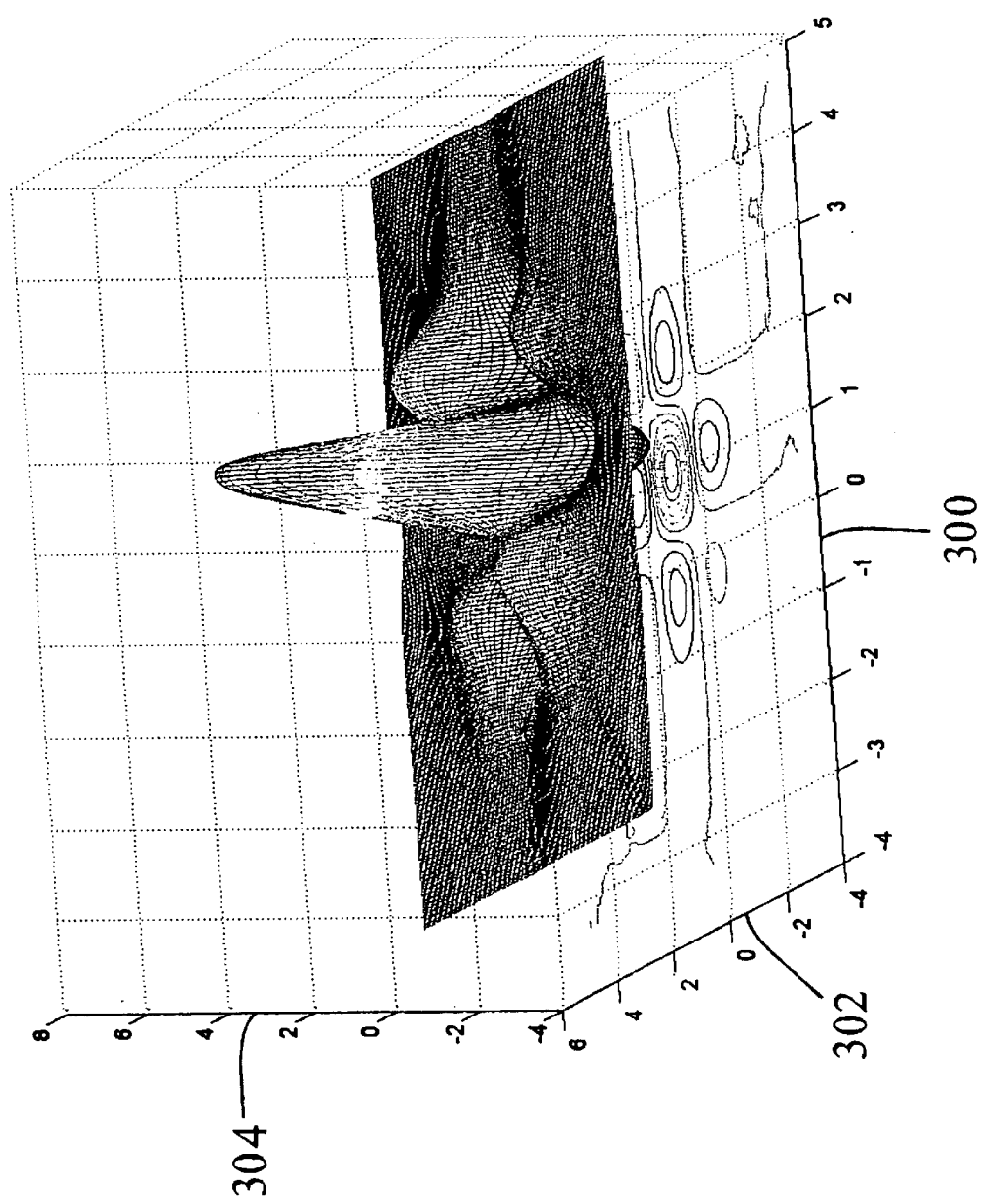
FIG. 9 illustrates the autocorrelation matrix at a filter input in accordance with one aspect of the present invention.

FIG. 9 is a plot of the autocorrelation matrix at the channel filter input. Time is plotted in nanoseconds along axis 300 and 302 and voltage is plotted along axis 304. The transition spacing of the isolated instances in the patterns is 10 microinches (254 nm) and axis 304 is in units of volts$^2 \times 10^{-5}$.

Figure 10:
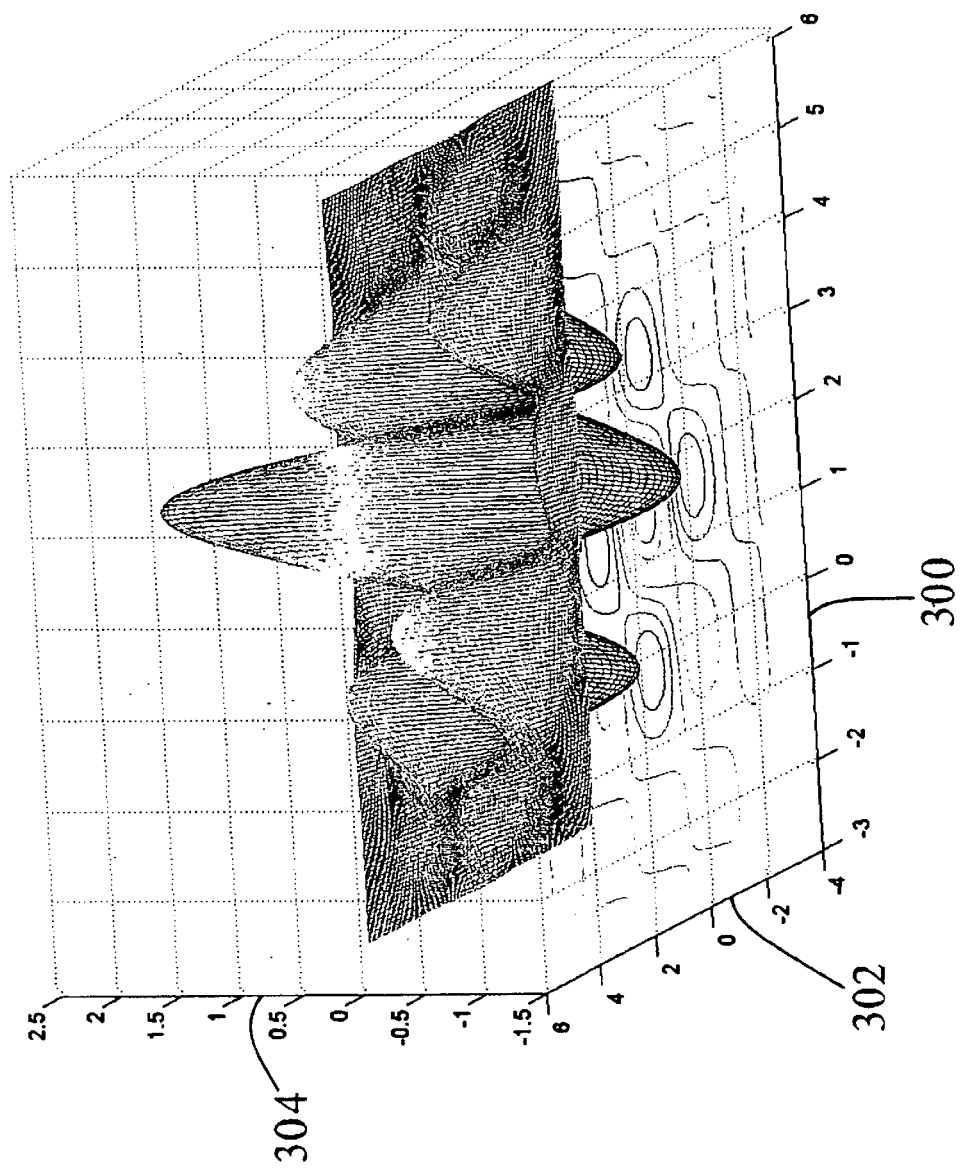
FIG. 10 illustrates an autocorrelation matrix at a filter output in accordance with one aspect of the present invention.

FIG. 10 illustrates the autocorrelation matrix at the filter output ($R_o$) plotted on similar axes to those shown in FIG. 9.

Thus, it can be seen that the present invention can be used to obtain the bit error rate of a data sampling system without the need for the development of the read/write channel circuitry, and without making any significant approximations. It has been observed that the entire measurement takes approximately three minutes and can be used in refining data head structures and comparing different kinds of data heads for implementation in next generation disc drives.

The present invention can be implemented as a method of determining bit error rate in a sampled data system having a disc 112 formed of a magnetic medium and a data head 126 for writing data on the disc 112 and retrieving data from the disc 112. The method includes the step 230 of writing a pattern on the disc 112, the pattern including M isolated instances 248 associated with a predetermined error event. The method also includes the step 232 of retrieving the pattern from the disc 112 and combining (at step 256) the M isolated instances 248 to obtain a representative instance $s_{av}(n)$ having a reduced media noise component. The method also includes the step 258 of combining the representative instance with each of the M isolated instances 248 to obtain M noise sequences, obtaining (at step 260) an autocorrelation component R based on the M instances read from the disc 112 and the M noise sequences, obtaining (at step 262) a channel filter having an impulse response h(n) based on the representative instance and based on channel requirements for a predetermined channel model, passing (at step 268) the representative instance through the filter with the impulse response h(n) to obtain a filter output sample (smp), and determining (at step 270) an error value indicative of the bit error rate (BER) based on the filter output sample and the autocorrelation component R.

In one illustrative embodiment, the method further includes the step 232 of storing the pattern retrieved from the disc 112. The retrieving step further comprises retrieving the pattern from the disc 112 of plurality of times (at step 234) to obtain a plurality of retrieved patterns and combining (at step 238) the retrieved patterns to obtain a representative retrieved pattern with a reduced electronic noise component.

In an illustrative embodiment, the step 238 of combining the retrieved patterns further includes temporally aligning the retrieved patterns and averaging the retrieved patterns.

The disc 112 can rotate at a velocity, and the step 238 of temporally aligning the retrieved patterns comprises, in one illustrative embodiment, the step 240 of adjusting a length of the retrieved patterns to accommodate for variation in the velocity.

The step 256 of combining the M instances further includes, in an illustrative embodiment, the step 256 of temporally aligning the M isolated instances 248 and averaging the M isolated instances 248 to obtain the representative instance. In one preferred embodiment, obtaining the M noise sequences is performed by the step 258 of subtracting the representative instance from the M instances. Further, the step of obtaining the autocorrelation component illustratively further comprises the step 260 of averaging the M noise sequences over the M isolated instances 248 to obtain an autocorrelation matrix R.

Further, a plurality of patterns can be written on the disc 112, each pattern including a plurality of isolated instances 248 associated with a different error event. An error value indicative of a total bit error rate corresponding to the error events is determined based upon weighted error values.

The present invention can also be implemented as an apparatus. A pattern writing component 204 writes the pattern on the disc 112. A pattern retrieving component 212 retrieves the pattern. A first combining component 218 obtains the representative instance, a second combining component 220 obtains the noise sequences, and an autocorrelation component generator 222 generates an autocorrelation component R. A channel filter generator 224 generates the channel filter, and an error determination component 228 determines an error value 229 indicative of the bit error rate based on the filter output sample and the autocorrelation component. The pattern retrieving component 212, in one embodiment, also includes a data store 214 and is configured to retrieve the pattern from the disc 112 a plurality of times.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular equalization target and error events for which the BER is desired while maintaining substantially the same functionality without departing from the scope and spirit of the present invention.

What is claimed is:

1. A method of determining bit error rate in a sampled data system having a disc formed of a magnetic recording medium and a data head for writing data on the disc and retrieving data from the disc, the method comprising steps of:

(a) writing a pattern on the disc, the pattern including isolated instances associated with a predetermined error event;

(b) retrieving the pattern from the disc;

(c) averaging the isolated instances to obtain a representative instance having a reduced media noise component;

(d) determining a difference between the representative instance and each of the isolated instances to obtain a corresponding number of noise sequences;

(e) averaging the noise sequences over the isolated instances to obtain an autocorrelation component based on the isolated instances read from the disc and the noise sequences;

(f) deriving a channel filter having an impulse response based on the representative instance and based on imposed channel requirements for a predetermined channel model and deriving an autocorrelation matrix at an output of the channel filter based on the impulse response;

(g) passing the representative instance through the filter with the impulse response to obtain a filter output sample; and (h) determining an error value indicative of the bit error rate based on the filter output sample and the autocorrelation component.

2. The method of claim 1 and further comprising a step of storing the pattern retrieved from the disc.

3. The method of claim 1 wherein the retrieving step comprises steps of:
(b) (i) retrieving the pattern from the disc a plurality of times to obtain a plurality of retrieved patterns; and
(b) (ii) combining the retrieved patterns to obtain a representative retrieved pattern with a reduced electronic noise component.

4. The method of claim 3 wherein the combining step (b)(ii) comprises steps of:
(d) (i) temporally aligning the retrieved patterns; and
(d) (ii) averaging the retrieved patterns.

5. The method of claim 4 wherein the disc rotates at a velocity and wherein the temporally aligning step comprises a step of adjusting a length of the retrieved patterns to accommodate for variation in the velocity.

6. The method of claim 3 wherein step (c) comprises a step of combining the isolated instances from the representative retrieved pattern.

7. The method of claim 1 wherein step (c) comprises the steps of:
(c) (i) temporally aligning the isolated instances; and
(c) (ii) averaging the isolated instances to obtain the representative instance.

8. The method of claim 1 wherein step (d) comprises a step of subtracting the representative instance from each of the isolated instances to obtain the noise sequences.

9. The method of claim 1 wherein the writing step comprises a step of writing a plurality of patterns on the disc, each pattern including a plurality of isolated instances associated with a different error event.

10. The method of claim 9 and further comprising:
repeating, for each of the plurality of patterns, steps (b) through (h).

11. The method of claim 10 and further comprising steps of:
(i) weighting each of the error values determined to obtain weighted error values; and
(j) determining a total error value indicative of a total bit error rate corresponding to the error events based on the weighted error values.

12. An apparatus for determining bit error rate in a sampled data system having a disc formed of a magnetic recording medium, the apparatus comprising:
a pattern writing component arranged relative to the disc to write a pattern on the disc, the pattern including isolated instances associated with a predetermined error event;
a pattern retrieving component arranged relative to the disc to retrieve the pattern from the disc;
a first combining component, coupled to the pattern retrieving component, combining the isolated instances to obtain a representative instance having a reduced media noise component;
a second combining component, coupled to the first combining component, determining a difference between the representative instance and each of the isolated instances to obtain a corresponding number of noise sequences;
an autocorrelation component generator, coupled to the second combining component, averaging the noise sequences over the isolated instances to generate an autocorrelation component based on the isolated instances read from the disc and the noise sequences;
a channel filter generator, coupled to the first combining component, generating a channel filter having an impulse response based on the representative instance and based on channel requirements for a predetermined channel model, wherein the channel is arranged to receive the representative instance and provide a filter output sample; and
an error determination component, coupled to the autocorrelation component generator and the channel filter, determining an error value indicative of the bit error rate based on the filter output sample and the autocorrelation component.

13. The apparatus of claim 12 and further comprising a data store storing the pattern retrieved from the disc.

14. The apparatus of claim 12 wherein the pattern retrieving component is configured to retrieve the pattern from the disc a plurality of times to obtain a plurality of retrieved patterns and combine the retrieved patterns to obtain a representative retrieved pattern with a reduced electronic noise component.

15. The apparatus of claim 14 wherein the pattern retrieving component is configured to combine the retrieved patterns by performing steps of:
(a) temporally aligning the retrieved patterns; and
(b) averaging the retrieved patterns.

16. The apparatus of claim 15 wherein the disc rotates at a velocity and wherein the temporally aligning step comprises a step of adjusting a length of the retrieved patterns to accommodate for variation in the velocity.

17. The apparatus of claim 14 wherein the first combining component is configured to combine the isolated instances from the representative retrieved pattern.

18. The apparatus of claim 12 wherein the first combining component is configured to temporally align the isolated instances and average the isolated instances to obtain the representative instance.

* * * * *